(12) United States Patent
Dufourd et al.

(10) Patent No.: US 8,437,690 B2
(45) Date of Patent: May 7, 2013

(54) TRANSMISSION OF A MULTIMEDIA CONTENT TO A RADIOCOMMUNICATION TERMINAL

(75) Inventors: Jean-Claude Dufourd, Le Kremlin Bicetre (FR); Cédric Gegout, Rennes (FR); Elouan Le Coq, Rennes (FR)

(73) Assignee: Streamezzo, Paris (FR)

( * ) Notice: Subject to any disclaimer, the term of this patent is extended or adjusted under 35 U.S.C. 154(b) by 785 days.

(21) Appl. No.: 12/066,917

(22) PCT Filed: Sep. 14, 2006

(86) PCT No.: PCT/EP2006/066388
§ 371 (c)(1),
(2), (4) Date: Sep. 8, 2008

(87) PCT Pub. No.: WO2007/031570
PCT Pub. Date: Mar. 22, 2007

(65) Prior Publication Data
US 2009/0197525 A1      Aug. 6, 2009

(30) Foreign Application Priority Data
Sep. 14, 2005   (FR) ...................................... 05 09409

(51) Int. Cl.
*H04H 40/00* (2008.01)
(52) U.S. Cl.
USPC .............. 455/3.06; 340/4.37; 340/4.4; 707/3; 707/722; 707/769
(58) Field of Classification Search .................. 455/3.06
See application file for complete search history.

(56) References Cited

U.S. PATENT DOCUMENTS

| | | | |
|---|---|---|---|
| 6,456,288 B1 * | 9/2002 | Brockway et al. | 345/428 |
| 6,911,982 B1 * | 6/2005 | Signes | 345/473 |
| 7,000,180 B2 * | 2/2006 | Balthaser | 715/240 |
| 7,080,059 B1 * | 7/2006 | Poston et al. | 707/769 |
| 7,366,986 B2 * | 4/2008 | Lee | 715/716 |
| 7,370,115 B2 * | 5/2008 | Bae et al. | 709/231 |

(Continued)

FOREIGN PATENT DOCUMENTS

| | | |
|---|---|---|
| FR | 2765983 A1 | 7/1997 |
| WO | 0223401 A2 | 3/2002 |

OTHER PUBLICATIONS

International Search Report of Counterpart Application No. PCT/EP2006/066388 Filed on Sep. 14, 2006.

(Continued)

*Primary Examiner* — Hai V Nguyen
(74) *Attorney, Agent, or Firm* — Zilka-Kotab, PC (57) ABSTRACT

A method is provided for transmitting a multimedia content from a server to a radiocommunication terminal, wherein the content comprises at least one multimedia, called initial, scene, and a series of instructions for moving the initial scene. The method includes transmitting an initial portion of the content from the server to the terminal, recording and reconstructing the initial portion on the terminal, transmitting at least one complementary portion of the content from the server to the terminal in the form of a complement to at least one portion previously received by the terminal in response to the request thereof, recording the complementary position, and reconstructing the multimedia scene updated according to the request from the portions previously received by the terminal.

14 Claims, 4 Drawing Sheets

U.S. PATENT DOCUMENTS

| | | | |
|---|---|---|---|
| 7,440,819 B2* | 10/2008 | Morel et al. | 700/245 |
| 7,548,237 B2* | 6/2009 | David et al. | 345/420 |
| 7,561,745 B2* | 7/2009 | Jang et al. | 382/232 |
| 7,565,671 B1* | 7/2009 | Ritter et al. | 725/10 |
| 7,631,277 B1* | 12/2009 | Nie et al. | 715/848 |
| 7,680,777 B2* | 3/2010 | Poston et al. | 707/999.003 |
| 7,725,829 B1* | 5/2010 | Wong et al. | 715/726 |
| 7,751,628 B1* | 7/2010 | Reisman | 382/232 |
| 7,805,746 B2* | 9/2010 | Brandyberry et al. | 725/110 |
| 7,808,900 B2* | 10/2010 | Suh | 370/230.1 |
| 7,934,008 B2* | 4/2011 | Tabatabai et al. | 709/231 |
| 8,023,751 B1* | 9/2011 | Reisman | 382/232 |
| 2001/0027468 A1* | 10/2001 | Okura | 709/202 |
| 2002/0004755 A1* | 1/2002 | Balthaser | 705/26 |
| 2003/0123542 A1* | 7/2003 | Lee | 375/240.08 |
| 2004/0111677 A1* | 6/2004 | Luken et al. | 715/523 |
| 2005/0128991 A1* | 6/2005 | Dayanandan et al. | 370/338 |
| 2005/0131930 A1* | 6/2005 | Jang et al. | 707/101 |
| 2005/0226196 A1* | 10/2005 | Suh | 370/338 |
| 2006/0130120 A1* | 6/2006 | Brandyberry et al. | 725/136 |
| 2006/0184980 A1* | 8/2006 | Cole | 725/88 |
| 2006/0218122 A1* | 9/2006 | Poston et al. | 707/1 |
| 2007/0192818 A1* | 8/2007 | Bourges-Sevenier et al. | 725/132 |
| 2008/0243857 A1* | 10/2008 | Gegout | 707/10 |
| 2009/0003389 A1* | 1/2009 | Joung et al. | 370/509 |
| 2009/0187933 A1* | 7/2009 | Ritter et al. | 725/12 |
| 2009/0197525 A1* | 8/2009 | Dufourd et al. | 455/3.06 |
| 2009/0241043 A9* | 9/2009 | Balthaser | 715/763 |
| 2010/0198815 A1* | 8/2010 | Poston et al. | 707/722 |

OTHER PUBLICATIONS

French Search Report of Counterpart Application No. FR/0509409 Filed on Sep. 14, 2005.

Williams, S.: "HTTP: Delta-Encoding Notes", Internet Citation, Jan. 17, 1997.

Floyd, R. et al.: "Mobile Web Access Using eNetwork Web Express", IEEE Personal Communications, IEEE Communication Society, US, vol. 5, No. 5, Oct. 1998.

Kalva, H. et al.: "MPEG-4 Systems and Applciations", ACM Multimedia '99, [Online] Oct. 21, 1999.

Kalva, H.: "Designing Object-Based Audio-Visual Content Representation Format for Mobile Devices", Circuits and Systems, 2004. MWSCAS '04, The 2004 47th Midwest Symposium on Hiroshima, Japan, Jul. 25-28, 2004, Piscataway, NJ, USA, IEEE, vol. 3, Jul. 25, 2004.

Signes, J.: "Binary Format for Scene (BIFS): Combining MPEG-4 Media to Build Rich Multimedia Services". Proceedings of the Spie, Bellingham, VA, US vol. 3653, Jan. 25, 1999.

Office Action from Chinese Patent Application No. 200680033751.7 dated May 3, 2011 (English translation only).

Written Opinion from International Application No. PCT/EP2006/066388 dated Dec. 11, 2006.

Examiner's First Report from Australian Patent Application No. 2006290666 dated Jan. 22, 2010.

Office Action from Chinese Patent Application No. 200680033751.7, dated Apr. 28, 2012.

* cited by examiner

TRANSMISSION OF A MULTIMEDIA CONTENT TO A RADIOCOMMUNICATION TERMINAL

CROSS-REFERENCE TO RELATED APPLICATIONS

This Application is a Section 371 National Stage Application of International Application No. PCT/EP2006/066388, filed Sep. 14, 2006 and published as WO 2007/031570 on Mar. 22, 2007, not in English.

FIELD OF THE DISCLOSURE

The field of the disclosure is that of restoring multimedia content on a radiocommunication terminal, for example of the wireless telephone, PDA ("Personal Digital Assistant"), portable computer, etc. type.

More precisely, the disclosure is based on the transmission of a multimedia content, of a portion of this content, and/or of elements representative of the latter, to a radiocommunication terminal.

With respect to multimedia content, this is a set comprised of at least one animated graphics scene, also called multimedia scene, and of a series of commands allowing this scene to change from one state to another. A multimedia scene corresponds in particular to the arrangement of a set of graphics objects in time and space, with which the user of the radiocommunication terminal can interact.

The disclosure has applications in all fields that require a representation of signals in the form of a spatio-temporal arrangement of graphics objects, with interactivity.

In particular, the disclosure applies to description formats of graphics scenes that are already known such as MPEG-4/BIFS ("Binary Format Scene"), SVG ("Scalable Vector Graphics"), SMIL ("Synchronized Multimedia Integration Language"), XHTML ("eXtensible HyperText Markup Language"), etc.

BACKGROUND OF THE DISCLOSURE

Techniques of transmitting multimedia content to a radiocommunication terminal are already known.

Conventionally, according to a first transmission technique, the design of a service, i.e. the offer of information to a user of a radiocommunication terminal, implements the following flow:
  initial content is sent to the terminal;
  the user consumes it, and makes a request;
  response content is then sent to the radiocommunication terminal, etc.

The service is therefore designed as a series of contents sent to the terminal of the user in response to interactive requests.

For example, if the user requests a weather service, the initial content sent to the terminal includes the weather forecast for the day.

The user consumes it, i.e. reads the weather forecast for the day, and makes a request to obtain the weather forecast for the following day.

New response content, comprising the weather forecast for the following day, is then sent to the radiocommunication terminal, with this new content replacing the initial content in the memory of the terminal.

According to this first transmission technique, each response content sent includes an entire scene, representative of the required content, but within the framework of the aforementioned example, only the pictograms that describe the weather to come will be modified, with the other graphics objects composing the multimedia scene of presenting weather forecasts remaining unchanged (for example the underlying map of France).

Consequently, a major disadvantage of this first technique of the prior art is that it requires the downloading of an entire scene in response to one request from the user, even if there are only a few modifications between the initial content and the response content.

Downloading the response content therefore corresponds at least partially to wasted time, which is costly in terms of transmission resources, all the more so that interactive multimedia services for radiocommunication terminals have the lowest bandwidth for mobile networks (about a dozen kilobits per second), and suffer from the "interactive" example of high-speed Internet.

In addition, the fact of loading a new scene introduces a rupture for the user: any context of local interaction is therefore lost, as well as any usage preferences. Indeed, according to this technique of prior art, the initial content is fully replaced by new content.

Consequently, when a communication session is broken and then followed by a reestablishment of the session, it may be necessary to load the initial content again for example in order to retrieve the usage preferences of the user.

There are moreover other techniques for transmitting multimedia content to a radiocommunication terminal.

As such, according to a second technique, scene commands make it possible to create scenes which are then sent progressively to the radiocommunication terminal.

Such commands are in particular defined in the BIFS and LASeR descriptive formats ("Lightweight Application Scene Representation"), such as defined in ISO/IEC 14496-20: 2006, published in 2006, of which a temporary version is available under reference MPEG N7480: "Study Text of ISO/IEC 14496-20/FCD".

These scene commands thus make it possible to start to play a scene before it is completely downloaded, if the commands are sent in increasing temporal order.

However, a disadvantage of this second technique is that it also requires the full loading of an entire scene in response to user interaction, even if according to this technique the radiocommunication terminal can begin to play the scene while it is being downloaded.

Figure 2A:
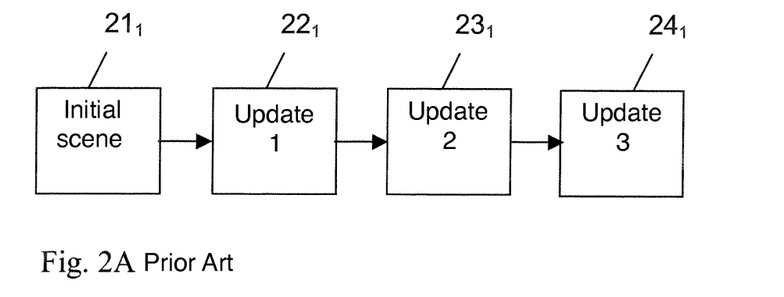
FIG. 2A (already commented on in relation with prior art) and 2B show the initial scene and its updates respectively according to the prior art and according to a particular embodiment of the invention.

In addition, as shown in relation with FIG. 2A, the initial scene $21_1$ restored by the terminal is replaced, as the multimedia content is transmitted, with a first updated scene $22_1$, then a second updated scene $23_1$, then a third updated scene $24_1$ . . . . The terminal thus loses knowledge of the initial scene, since the last scene memorized in the terminal corresponds to the last updated scene (for example, the third updated scene $24_1$).

As such, a major disadvantage of this technique is that in the event the transmission is interrupted and then re-established, the terminal must load the initial scene again, especially if the user wishes to retrieve his preferences and/or any context of local interaction.

Finally, a third known technique in transmitting multimedia content to a radiocommunication terminal is shown.

According to this technique, the media player (radiocommunication terminal) has a programming language interpreter, for example of the ECMAScript or Java (registered trademarks) type. The scene includes a complex script that connects to a server, implements a data exchange protocol with the server (parsing of an XML document if the data exchanged with the server is in XML format, for example) and builds the elements of the scene according to the data received.

This third technique reverts to implementing the equivalent of scene commands within the very script of the scene itself.

However, this technique does not apply to current mobile terminals, since very few terminals have the environment, resources or performance that are required to implement it.

In addition, a major disadvantage of this technique is that it generates a high implementation cost, and in light of current resources, it can only be applied to simple scenes, comprising simple graphics objects that have little movement.

Other disadvantages of this technique of the prior art reside furthermore in the size of the content, the complexity in creating content, and the interdependency between the content and the servers implementing the same variant of the data exchange protocol.

Indeed, content containing a processing script of the data exchange protocol with the server has a minimal size (excluding the scene properly speaking) of approximately 1000 to 40,000 octets. The variability in the size of the script comes in particular from the possibility of implementing protocols of the "XML" type, more voluminous in terms of size, or binary, which are less voluminous, and of providing protocols that are more or less complete in terms of the number of possible scene modification commands.

As such, the degree of complexity in creating content according to this technique of the prior art is higher than that for simple "passive" content, i.e. without a script.

Finally, another disadvantage of this third technique is that in order to be able to server data to such content, the server has to implement the data exchange protocol used by the content that it has to serve. The server must therefore where applicable be modified or replaced with another server, in order to be adapted to content using another data exchange protocol.

SUMMARY

An aspect of the disclosure relates to a method for transmitting multimedia content from a server to a radiocommunication terminal, said content comprising at least one multimedia scene, called initial scene, and a series of commands making it possible to have said initial scene change.

The method of transmitting comprises:
  a transmission step from the server to the terminal of an initial portion of the content, comprising at least the initial scene;
  a memorization step followed by a restitution step of the initial portion on the terminal;
  at least one transmission step from the server to the terminal of a complementary portion of the content, in the form of a complement of at least one portion previously received by the terminal, in response to a request coming from the terminal;
  a memorization step of complementary portion, followed by a restitution step by terminal of the updated multimedia scene according to the request, using previously-received portions.

As such, an embodiment of the invention proposes an entirely new and inventive approach for transmitting multimedia content to a radiocommunication terminal based on the transmission of an initial portion of the content, then on the transmission of complementary portions of the content, corresponding to complements or differences, between one or several portions previously received by the terminal (for example, the initial portion), following a request from the terminal.

In this manner, the terminal can restore the updated multimedia scene, by combining the complement with the initial scene or a previously-updated multimedia scene.

Note in particular that the steps of transmitting and memorizing the complementary portion, and of restoring by the terminal of the updated multimedia scene, can be repeated as many times as necessary, and as many times as there are requests and therefore complementary portions of content.

In particular, the initial portion includes at least one command of the series of commands.

An embodiment of the invention therefore makes it possible to structure the multimedia content representative of a service transmitted to a radiocommunication terminal, in such a way that an initial portion of the content, comprising at least the initial scene and possibly updating commands for the initial scene, be first transmitted to the terminal. Then, in response to a first request, a complementary portion is transmitted to the terminal in the form of a complement of the initial portion, making it possible to restore the updated multimedia scene in response to the request. If a new request is issued to the server, another complementary portion is transmitted to the terminal in the form of a complement of at least one portion previously received by the terminal, making it possible to restore the updated multimedia scene in response to the new request, and so on.

So, by structuring the services in the form of successive portions of content, a series of incremental portions of reduced size are transmitted in relation to techniques of prior art, which makes it possible to reduce the response time of mobile services.

The flow to the radiocommunication terminal is therefore comprised of a series of complements, or differences, between the successive states of the multimedia scene. This flow is divided according to the invention into different portions of content.

The technique according to an embodiment of the invention thus makes it possible to obtain a gain in response time to interactions, and a gain in the effectiveness of the service for the user and the operator, since the same result is obtained (same content), by downloading less data.

An embodiment of the invention thus offers an impression of continuity and service fluidity since the latter is designed in the form of successive modifications of a multimedia scene, as well as major savings in time since only the modification of the current content is sent to the terminal.

In addition, in relation to techniques based on the use of a complex script that connects to a server, and that require the use of a programming language interpreter of the ECMAScript or Java (registered trademarks) type for example, an embodiment of the invention makes it possible to use a media player that requires less resources, thus available on communication terminals, for example telephones, that are less costly.

Moreover, since a portion of the content is simpler and of reduced size in relation to techniques of prior art, the cost of creating it and its transmission time are not as high.

Finally, while according to the prior art of the ECMAScript type the server and the script of the multimedia content necessarily implement the same data transmission protocol, an embodiment of the invention allows for interoperability between all servers and content.

Also consider that a "complement" transmitted in a complementary portion includes scene modification commands making it possible to have a current scene change to an updated scene according to a request coming from the terminal.

As such, the terminal can store the initial portion in a local context, including the initial scene and any commands making it possible to have this scene change, and the various complements as they are transmitted from the server to the terminal. This local context is therefore incremented with the various commands transmitted in the complementary portions.

Consequently, while according to the prior art such as shown in FIG. 2A the initial scene changes, in the memory of the terminal, during the various updates transmitted by the server in response to the various requests of a user, the terminal according to an embodiment of the invention always keeps the initial scene and the commands that allow for an update of the multimedia scene available, in a local context.

Consequently, in the event a communication session is cut off and then re-established, it is not necessary for the server to re-transmit the initial scene and/or the modification commands to the terminal.

In particular, this solution allows for "off-line" work, in the sense that a user can disconnect and reconnect without losing any information.

By way of example, take an initial scene composed of several tabs, for example an "Information" tab, a "Cinema" tab, and a "Music" tab, the user of the terminal can chose the "Cinema" tab, which results in displaying the Cinema programs for the week. Once the content has been restored on the display (for example a screen) of the terminal, the user or (the terminal directly) can chose to disconnect (i.e. switch to "off-line" mode), while the user consults the program.

The local context according to an embodiment of the invention thus includes the initial scene, and a command for modifying the displayed tab to "Cinema".

Then consider that the user then wishes to look at the news for the day, by choosing the "Information" tab. The terminal thus goes back to "on-line" mode, also called connected mode. The local context then includes the initial scene, the command to modify the tab displayed as "Cinema", and a command to modify the "Cinema" tab to "Information".

According to prior art, the terminal has updated in its memory the initial scene during the choice of the "Cinema" tab, and has replaced it with the Cinema programs for the week. The terminal must therefore send a request to the server, asking it to transmit the initial scene again. The context of local interaction is therefore lost.

According to an embodiment of the invention, the terminal still has the local context in memory, and can therefore quickly find the different commands making it possible to switch from the initial scene, to the latest scene restored before disconnection.

Following the request from the terminal, the server therefore does not have to transmit the initial scene again. It is sufficient for it to transmit the terminal a complementary portion, in the form of a complement of the initial portion making it possible to update the multimedia scene. In particular, these complements are predefined by the author, or the service program, and are not calculated by the server.

The terminal can then restore the updated multimedia scene according to the request of the user, i.e. develop the "Information" tab, using the initial portion and the complementary portion (and possibly other complementary portions that have been previously received by the terminal).

In particular, an interest in switching from connected mode/disconnected mode resides in the rapidity and in the simultaneous processing of an increased number of requests. Indeed, if all of the users maintain their connection with the server constant, i.e. if the service is designed as a unique scene from the beginning to the end of the service, receiving modifications over time, then the limit number of clients that the server can serve is N. However, if the users cut off the connection after each response received from the server, and re-establish a connection to receive the next response from the server, then the server is only limited to N simultaneous requests.

In particular, the request coming from the terminal is a request from a user of the terminal, or a request subsequent to the restoring of the updated multimedia scene.

As such, the complements in response to these requests can be predefined during the creation or storage of multimedia content within the framework of a request subsequent to the restoring of the scene. For example, if a user clicks on a "tomorrow's weather" tab, once the weather for the following day has been restored, a "today's weather" button appears.

Requests can also come from a user, resulting in a dynamic sectioning of the complements to be transmitted to the terminal.

According to an alternative of the invention, the method of transmitting implements at least two distinct transmission channels, or different transport sessions (even with different transport protocols), for the different portions of content.

As such, since the complement transmitted is simple and requires few transmission resources, the complementary portion can be transmitted over low-speed networks.

In particular, the initial portion of the content is transmitted using a high-speed channel (for example via the Internet network) and/or stored in the terminal beforehand.

According to an alternative embodiment, the portions (initial and/or complementary portions) are contained in separate documents on the server.

For example, these documents are of the "Web" page type, or are generic content of the "streamed" or "broadcasted" type.

For example, the author (or the service program) directly creates content A, then another document noted as content C, such that content C is defined as the difference between content B and content A (content C=content B−content A).

According to this embodiment of the invention, it is the terminal that virtually restores content B in its memory. As such, content B is not memorized in the server.

In particular, these separate documents are referenced by addresses that can be distinct, and can be received by different means of data transport.

According to a particular embodiment, the server also transmits to the terminal a configuration signal of the multimedia scene of the "Append" type in the "LASeR" format.

This signal makes it possible in particular to inform the terminal that the commands that are sent to it are commands to modify elements of a scene, not an entire scene to be downloaded.

The commands that make it possible to have the scene change are, according to this particular embodiment, "LASeR Commands" scene commands.

Another aspect of the disclosure relates to a computer software product downloadable from a communications network and/or stored on a support that can be read by computer and/or which can be executed by a microprocessor, comprising program code instructions for implementing the method for transmitting multimedia content described previously.

Yet another aspect of the disclosure relates further to a transmission signal of multimedia content to a radiocommunication terminal, comprising at least two portions of content, of which an initial portion and at least one complementary portion, said complementary portion being transmitted to said terminal in the form of a complement of at least one portion previously received by said terminal, in response to a request coming from said terminal.

Note that, in another embodiment, the initial portion and the complementary portions can be transmitted in an independent form, for example in distinct channels, according to distinct transport protocols, etc.

Another aspect of the disclosure relates moreover to a radiocommunication terminal intended to receive multimedia content, comprising:
- means of receiving an initial portion of the content, comprising at least the initial scene, and at least one complementary portion of the content, received in the form of a complement of at least one portion previously received by the terminal, in response to a request coming from said terminal;
- means for memorizing the initial portion and complementary portion;
- means of restoring the initial portion and the updated multimedia scene according to the request, using previously-received portions.

In particular, the receiving means of the terminal are able to receive a plurality of portions of content transmitted according to at least two distinct transmission channels.

Yet another aspect of the disclosure relates to a method of restoring multimedia content in a radiocommunication terminal, comprising a memorization step of a set of at least one initial scene, and at least one iteration of the following steps:
- emission of a request to a multimedia content broadcast server;
- reception of a complement of the multimedia scene restored by said terminal in response to said request;
- determination by said terminal of the updated multimedia scene, combining data representative of said initial scene or of a previously-updated multimedia scene, and said complement;
- display of said updated multimedia scene.

Finally, another aspect of the disclosure relates to a multimedia content broadcast server to at least one radiocommunication terminal, comprising:
- means of transmitting an initial portion of said content, including at least said initial scene;
- means of processing a request;
- means of transmitting a complementary portion of said content, in the form of a complement of at least one portion previously received by said terminal, in response to said request coming from said terminal.

BRIEF DESCRIPTION OF THE DRAWINGS

Other characteristics and advantages shall appear more clearly when reading the following description of a particular embodiment, provided by way of a simple, illustrative and non limiting example, and the annexed drawings, among which.

DETAILED DESCRIPTION OF ILLUSTRATIVE EMBODIMENTS

The general principle of an embodiment of the invention is based on the partitioning of multimedia content, including at least one multimedia scene and a series of commands making it possible to have this scene change, in at least two portions, of which an initial portion and at least one complementary portion.

A first portion of content, called initial portion, is first transmitted to the radiocommunication terminal. Then, a portion called complementary is transmitted to the radiocommunication terminal, in response to a request coming from the terminal.

An embodiment of the invention thus makes it possible to rebuild interactive multimedia scenes giving the impression of service fluidity, while reducing the quantity of data downloaded by the terminal.

Dividing the multimedia content to be transmitted into incremental scenes also makes it possible to achieve considerable savings on the servers.

Indeed, a server is normally limited to processing N clients in parallel, with the number N depending on the power of the machine, the complexity of the service, etc.

If all of the users maintain their connection with the server constant, i.e. if the service is designed as a unique scene from the beginning to the end of the service, receiving modifications over time, then the limit number of clients that the server can serve is N.

However, if the users cut off the connection after each response received from the server, and re-establish a connection to receive the next response from the server, then the server is only limited to N simultaneous requests. The number of clients served by a server is then much higher, of a factor linked to the relationship between the transmission times of the complementary portion and the average time between user interactions, a ratio which can exceed 100.

More precisely, according to a particular embodiment of the invention, the complementary portion transmitted includes a complement, in the form of a global scene modification command, comprising modification commands of at least one element of the scene ("LASeR Commands") in "LASeR" format.

According to an alternative of this embodiment, a global scene modification command also includes a scene configuration signal of the "append" type. This "append" mode is conventionally defined in the LASeR standard to indicate that a current scene does not include an initial scene, but only a series of commands that apply to the scene already loaded in the terminal.

Users can then cut off the connection with the server since the latter has the "append" mode, which according to an embodiment of the invention makes it possible to warn that the response must be added to the current scene.

Moreover, since the servers cannot maintain a client session open indefinitely, they are conventionally obliged to consider that a silent client, i.e. one that is not issuing any request to its attention, is automatically disconnected after a given period of time has elapsed.

According to an embodiment of the invention, dividing the multimedia content to be transmitted into incremental scenes allows the server to cut off the connection immediately, and to re-establish a connection after an arbitrarily long period of time.

A particular embodiment of the invention is now shown, according to which the complementary portion transmitted includes a global scene modification command, comprising modification commands of at least one element of the scene ("LASeR Commands"), in "LASeR" format.

Scene commands, also called modifications commands for an element of the scene, make it possible in particular to express a modification of a scene, i.e. a complement of a previously-restored scene on the terminal.

Figure 1:
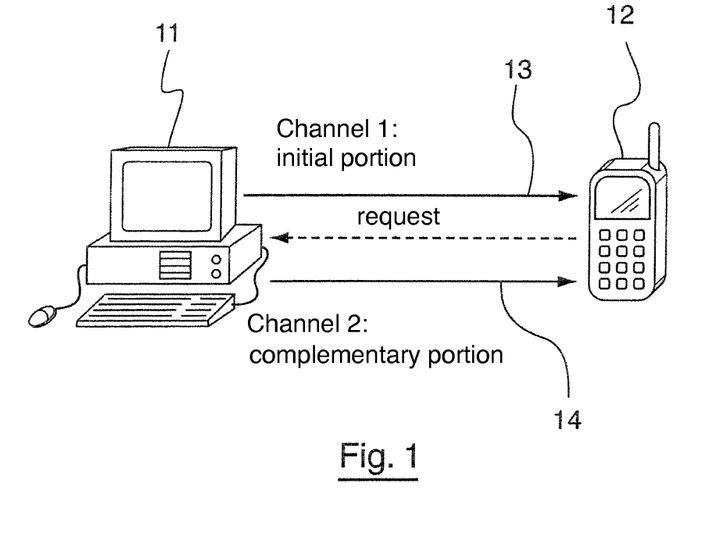
FIG. 1 shows the general principle of an embodiment of the invention, according to which the multimedia content to be transmitted to the radiocommunication terminal is divided into at least two portions of which an initial portion and at least one complementary portion, with the initial portion being first transmitted to the terminal, then a complementary portion being transmitted to the terminal in response to a request coming from the terminal.

FIG. 1 shows in particular an application of an embodiment of the invention according to which a server 11 provides a service to a radiocommunication terminal 12.

Recall that a service is designed as a series of contents, or portions of content, sent to the terminal of the user, in particular in response to interactive requests.

According to an embodiment of the invention, the multimedia content to be transmitted to radiocommunication terminal 12 includes at least one multimedia scene and a series of commands making it possible to have the multimedia scene change.

Server 11 first transmits a first portion, called initial portion, to radiocommunication terminal 12 during a transmission step 13.

Server 11 then transmits a complementary portion including LASeR scene commands to terminal 12 during a transmission step 14, in response to a request coming from the terminal.

Figure 5:
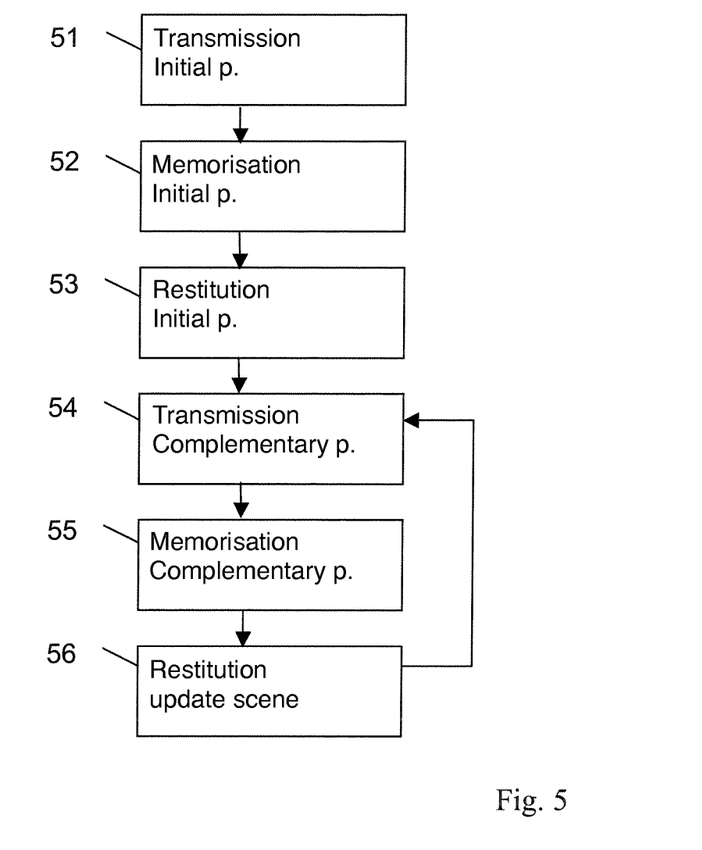
FIG. 5 shows the principal step of the method according to a particular embodiment of the invention.

As shown in FIG. 5, during a step 52, the terminal 12 memorizes, in a local context, the initial portion transmitted by server 11 during a step 51.

Terminal 12 then restores the initial scene during a step 53.

Server 11 then transmits a complementary portion, in the form of a complement of the initial scene and/or of a previously-received complementary portion, during a transmission step of a complementary portion 54, in response to a request coming from the terminal. The terminal memorizes the complementary portion during a step 55, or directly memorizes the modification commands for the scenes corresponding to this complementary portion, in a local context also including the initial portion.

The terminal then restores an updated scene, using the memorized initial portion and complementary portion, during a step 56.

Steps 54, 55 and 56 can be repeated as many times as necessary and in particular as many times as there are requests coming from the terminal.

Figures 3A, 3B, 3C:
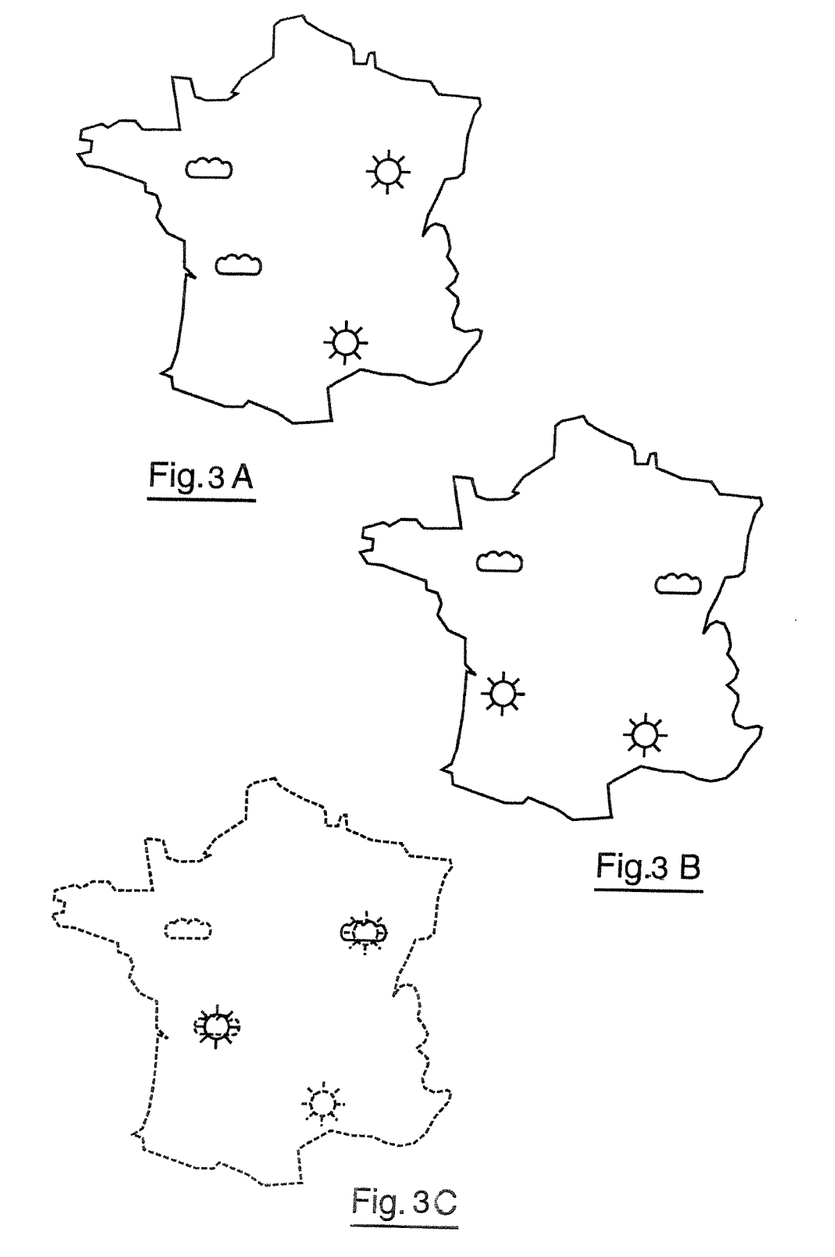
FIGS. 3A, 3B and 3C show respectively the initial scene, an update of the initial scene such as restored on the terminal subsequent to a request, and the complementary portion transmitted by the server corresponding to said request, according to FIG. 1.

In particular in relation with FIGS. 3A, 3B and 3C an example of an embodiment of the invention is shown, for the transmission to the radiocommunication terminal 12 of a weather service.

Consider in particular in this example that FIG. 3A corresponds to an initial multimedia scene, and shows the weather forecasts for France for the day.

When the user of the radiocommunication terminal 12 wishes to access the weather service, he sends a request to server 11.

The latter then sends him the weather map for the day, corresponding to the initial portion.

It can in particular be considered that when the initial portion is voluminous, and consequently long to download, it is not sent during an interactive phase. On the contrary, this initial portion can for example be pre-loaded on terminal 12, or be transmitted via a multi-broadcast channel (for example, of the DVBH "Digital Video Broadcasting Handheld", DMB "Digital Multimedia Broadcast", or multicast type). Its size is therefore less critical.

If the user of terminal 12 wishes to view the weather map for the following day, he must send a request to server 11, asking it to transmit back the weather map for the next day, shown in FIG. 3B.

According to the techniques of prior art, server 11 transmits again in full the weather map in FIG. 3B, even if the modifications between the map for today (FIG. 3A) and the map for the following day (FIG. 3B) are minor.

These modifications are shown in FIG. 3C, the drawing in dotted lines corresponding to the initial portion and the drawing in solid lines corresponding to the complementary portion.

Server 11 thus transmits this complementary portion to radiocommunication terminal 12, in the form of an additional scene using LASeR format scene commands.

The user can then formulate other requests, and so on.

It can in particular be noted that the time between the request from the user and the arrival of the response on terminal 12, subtracting the time for the server 11 to create the response, is proportional to the size of the response, and inversely proportional to the bandwidth. As such, any gain as to the size of the response has a crucial positive influence on response time, and thus as can be induced, on interactivity.

In other words, in order to reduce the size of the content or of the portions of multimedia content to transmit to the terminal in response to the requests of a user, and to increase the impression of fluidity of the service, response content is considered as modifications to the scene from which the user has sent the request.

These modifications are sent in the form of a list of scene commands. An example is shown hereinafter of the structure of an initial portion, including at least one multimedia scene, and an insertion command of the scene, comprising:
  a background map of France with various additional information concerning the origin of the service;
  a text T0: "today's weather", with all of the information pertaining to the font, style, colour and positioning;
  five texts T1 to T5, presenting the temperature, of the "15° C." type, on five points of the map, with all of the associated font, style, colour and positioning information;
  a set of links or buttons to obtain the weather for tomorrow and the following days.

The complementary portion, corresponding to an incremental scene, has the following structure according to an embodiment of the invention:
  a configuration signal of the "append" type, present in an alternative of this embodiment but being optional;
  a command to modify the character string T0 to "tomorrow's weather";
  five commands to modify character strings T1 to T5 representing the temperature;
  a command to replace the "tomorrow" button or link with a "today" button or link.

According to the particular embodiment of the invention, the incremental scene is created in response to the use of the "tomorrow" button or link, i.e. in response to a request from the user. It is observed especially according to this example that only the character strings are replaced, not their font, style, colour and positions.

It can be noted that this global modification command, including the scene configuration signal in "append" mode and the modification commands of at least one element of the scene ("LASeR Commands") are potentially applicable to all descriptive formats of multimedia scenes. As such, the BIFS format already defines "BIFS Commands" which are similar to "LASeR Commands". Likewise, the "LASeR Commands" can be applied without modification to the SVG format.

In addition, these functions are already implemented effectively in telephones, which allows an embodiment of the invention to be implemented in current terminals, even relatively limited ones.

As such, by structuring the multimedia content to be transmitted to a radiocommunication terminal, an embodiment of the invention makes it possible to reduce the size of the portions of the content to send to the terminal, which offers the double advantage of reducing bandwidth consumption, thus improving response time, and to obtain service continuity and fluidity on the terminal, since only the complement of the current content is sent to the terminal rather than the complete response content.

Figure 2B:
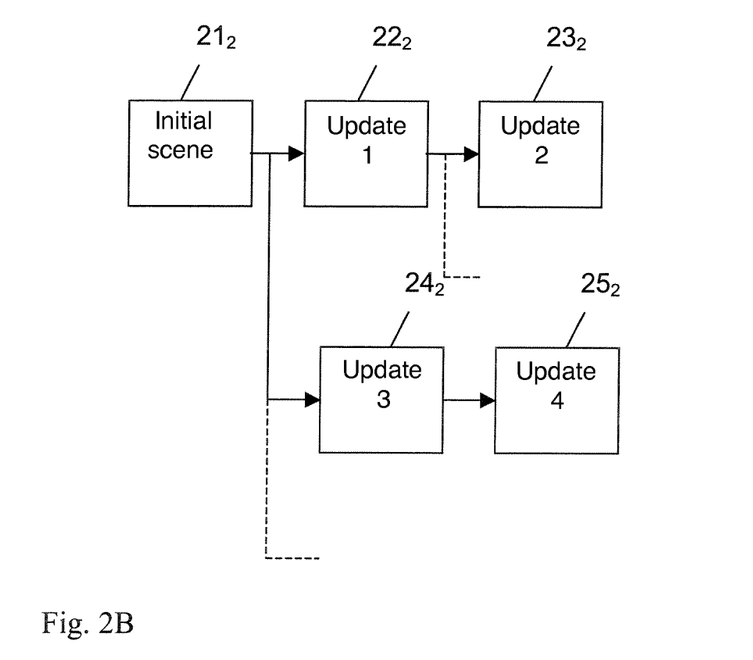

In addition, as shown in FIG. 2B, the local context memorized by the terminal incremented at each reception of a complementary portion makes it possible to keep the successive modifications that the initial portion has undergone. As such, in the case where the terminal cuts off the connection with the server after update no. 3 ($24_2$) of initial scene $21_2$, the terminal has memorized the different commands for modifying the scene corresponding to updates no. 1 ($22_2$), no. 2 ($23_2$) and no. 3 ($24_2$), contrary to the prior art wherein the terminal only memorized update no. 3 (FIG. 2A). During the following connection, the terminal uses the local context and the complementary portion to restore the updated scene.

Figure 4:
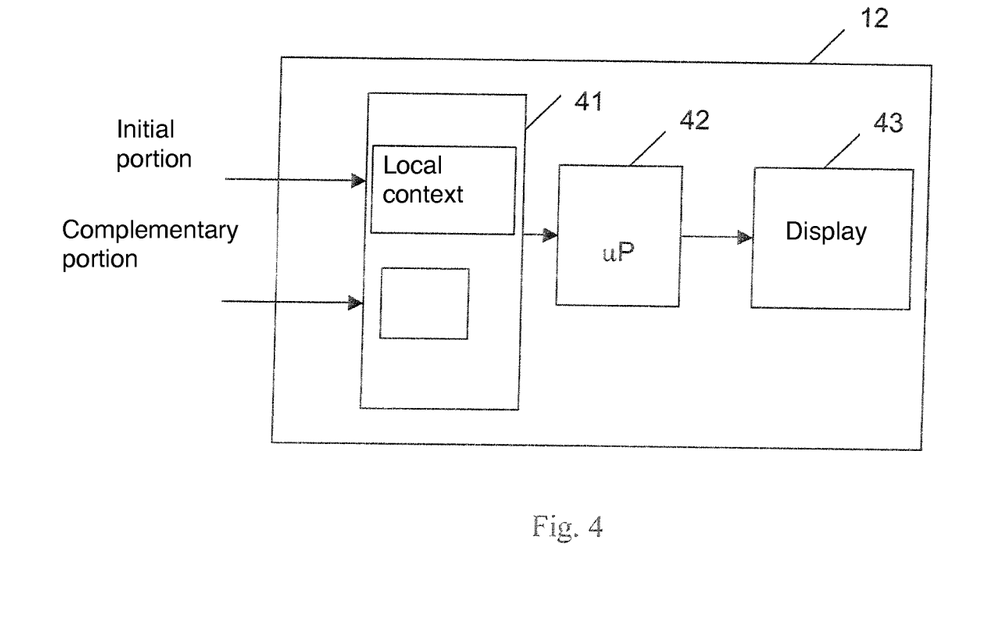
FIG. 4 shows a portion of the structure of the terminal according to a particular embodiment of the invention.

In relation with FIG. 4, a portion of the structure of the terminal according to this particular embodiment of the invention is shown. The terminal uses a memory 41 to memorized the local context linked to the initial portion received from the server, and can make use of it to memorize the complementary portions received via the server.

Microprocessor 42 uses the local context and each complementary portion to rebuild an updated scene, and transmits it to display module 43 which restores the updated scene.

An aspect of the disclosure provides a technique for transmitting multimedia content to a radiocommunication terminal that does not require the downloading of complete scenes in response to an interaction.

Another aspect of the disclosure implements such a technique making it possible to reduce response time to interactions in relation to techniques of prior art, especially in the event of interruption(s) in the communication session.

In particular, an aspect of the disclosure provides such a technique having better performance in terms of service fluidity on radiocommunication terminal.

An aspect of the disclosure provides such a technique of transmitting requiring little resources in terms of bandwidth.

Yet another aspect of the disclosure provides such a technique making it possible to create multimedia terminals that are simple and not costly, that do not require substantial means of processing, or substantial means for memorizing data.

Although the present disclosure has been described with reference to one or more examples, workers skilled in the art will recognize that changes may be made in form and detail without departing from the scope of the disclosure and/or the appended claims.

The invention claimed is:

1. A method, comprising:
   establishing a connection with a server by a radiocommunication terminal;
   sending, to said server by said radiocommunication terminal via said connection, a first request for an initial portion of multimedia content, comprising at least one first multimedia scene;
   in response to said first request for said initial portion of said multimedia content, receiving from said server at said radiocommunication terminal over said connection said initial portion of said multimedia content, comprising said at least one first multimedia scene;
   storing said initial portion at said radiocommunication terminal;
   displaying said stored initial portion at said radiocommunication terminal;
   sending, to said server by said radiocommunication terminal via said connection, a second request for a second portion of said multimedia content, comprising at least one second multimedia scene;
   in response to said second request for said second portion of said multimedia content, receiving from said server at said radiocommunication terminal over said connection at least one first complementary portion of said multimedia content, in the form of a first complement of said initial portion previously received by said radiocommunication terminal, said first complement including only differences between said at least one first multimedia scene and said at least one second multimedia scene separate from said at least one first multimedia scene;
   storing said first complementary portion at said radiocommunication terminal;
   displaying by said radiocommunication terminal only said second multimedia scene according to said second request, using said stored initial portion received via said connection and said stored first complementary portion received via said connection;
   sending, to said server by said radiocommunication terminal via said connection, a third request for a third portion of said multimedia content, comprising at least one third multimedia scene;
   in response to said third request for said third portion of said multimedia content, receiving from said server at said radiocommunication terminal over said connection at least one second complementary portion of said multimedia content, in the form of a second complement of said initial portion previously received by said radiocommunication terminal, said second complement including only differences between said at least one first multimedia scene and said at least one third multimedia scene separate from said at least one first multimedia scene;
   storing said second complementary portion at said radiocommunication terminal; and
   displaying by said radiocommunication terminal only said third multimedia scene according to said third request, using said stored initial portion received via said connection and said stored second complementary portion received via said connection;
   wherein said connection is cut off by said radiocommunication terminal after each response received from said server, and is re-established to receive a next response from said server, such that a number of simultaneous requests to said server is limited.

2. The method of claim 1, wherein said initial portion includes at least one command of a series of commands.

3. The method of claim 1, wherein the method implements at least two distinct transmission channels for different portions of said multimedia content.

4. The method of claim 3, wherein said initial portion of said multimedia content is transmitted using a high-speed channel and/or stored beforehand in said radiocommunication terminal.

5. The method of claim 1, wherein said initial portion and said first complementary portion are contained in separate documents on said server.

6. The method of claim 5, wherein said separate documents are referenced by distinct addresses.

7. The method of claim 1, wherein said server also transmits to said radiocommunication terminal a configuration signal of said at least one multimedia scene of an "Append" type in "LASeR" format.

8. The method of claim 1, wherein said restitution of only said second multimedia scene includes modifying said at least one first multimedia scene with said at least one first complementary portion of said multimedia content to create said second multimedia scene.

9. The method of claim 1, wherein said at least one first complementary portion of said multimedia content includes scene modification commands for changing said at least one first multimedia scene to said second multimedia scene.

10. The method of claim 1, wherein said simultaneous requests are from radiocommunication terminals being simultaneously serviced by said server.

11. The method of claim 1, wherein after receiving a response from said server to said request for multimedia content, said radiocommunication terminal stores both of said initial portion received via said connection, and said last complementary portion received via said connection, such that said server is prevented from repeating transmission of said initial portion to said radiocommunication terminal.

12. A computer software product embodied on a non-transitory support, comprising:
program code for establishing a connection with a server by a radiocommunication terminal;
program code for sending, to said server by said radiocommunication terminal via said connection, a first request for an initial portion of multimedia content, comprising at least one first multimedia scene;
program code for in response to said first request for said initial portion of said multimedia content, receiving from said server at said radiocommunication terminal over said connection said initial portion of said multimedia content, comprising said at least one first multimedia scene;
program code for storing said initial portion at said radiocommunication terminal;
program code for displaying said stored initial portion at said radiocommunication terminal;
program code for sending, to said server by said radiocommunication terminal via said connection, a second request for a second portion of said multimedia content, comprising at least one second multimedia scene;
program code for in response to said second request for said second portion of said multimedia content, receiving from said server at said radiocommunication terminal over said connection at least one first complementary portion of said multimedia content, in the form of a first complement of said initial portion previously received by said radiocommunication terminal, said first complement including only differences between said at least one first multimedia scene and said at least one second multimedia scene separate from said at least one first multimedia scene;
program code for storing said first complementary portion at said radiocommunication terminal;
program code for displaying by said radiocommunication terminal only said second multimedia scene according to said second request, using said stored initial portion received via said connection and said stored first complementary portion received via said connection;
program code for sending, to said server by said radiocommunication terminal via said connection, a third request for a third portion of said multimedia content, comprising at least one third multimedia scene;
program code for in response to said third request for said third portion of said multimedia content, receiving from said server at said radiocommunication terminal over said connection at least one second complementary portion of said multimedia content, in the form of a second complement of said initial portion previously received by said radiocommunication terminal, said second complement including only differences between said at least one first multimedia scene and said at least one third multimedia scene separate from said at least one first multimedia scene;
program code for storing said second complementary portion at said radiocommunication terminal; and
program code for displaying by said radiocommunication terminal only said third multimedia scene according to said third request, using said stored initial portion received via said connection and said stored second complementary portion received via said connection;
wherein said connection is cut off by said radiocommunication terminal after each response received from said server, and is re-established to receive a next response from said server, such that a number of simultaneous requests to said server is limited.

13. A radiocommunication terminal, comprising:
a processor for:
establishing a connection with a server by a radiocommunication terminal;
sending, to said server by said radiocommunication terminal via said connection, a first request for an initial portion of multimedia content, comprising at least one first multimedia scene;
in response to said first request for said initial portion of said multimedia content, receiving from said server at said radiocommunication terminal over said connection said initial portion of said multimedia content, comprising said at least one first multimedia scene;
storing said initial portion at said radiocommunication terminal;
displaying said stored initial portion at said radiocommunication terminal;
sending, to said server by said radiocommunication terminal via said connection, a second request for a second portion of said multimedia content, comprising at least one second multimedia scene;
in response to said second request for said second portion of said multimedia content, receiving from said server at said radiocommunication terminal over said connection at least one first complementary portion of said multimedia content, in the form of a first complement of said initial portion previously received by said radiocommunication terminal, said first complement including only differences between said at least one first multimedia scene and said at least one second multimedia scene separate from said at least one first multimedia scene;
storing said first complementary portion at said radiocommunication terminal;
displaying by said radiocommunication terminal only said second multimedia scene according to said second request, using said stored initial portion received via said connection and said stored first complementary portion received via said connection;

sending, to said server by said radiocommunication terminal via said connection, a third request for a third portion of said multimedia content, comprising at least one third multimedia scene;

in response to said third request for said third portion of said multimedia content, receiving from said server at said radiocommunication terminal over said connection at least one second complementary portion of said multimedia content, in the form of a second complement of said initial portion previously received by said radiocommunication terminal, said second complement including only differences between said at least one first multimedia scene and said at least one third multimedia scene separate from said at least one first multimedia scene;

storing said second complementary portion at said radiocommunication terminal; and displaying by said radiocommunication terminal only said third multimedia scene according to said third request, using said stored initial portion received via said connection and said stored second complementary portion received via said connection;

wherein said connection is cut off by said radiocommunication terminal after each response received from said server, and is re-established to receive a next response from said server, such that a number of simultaneous requests to said server is limited.

14. A broadcast server, comprising:

a processor for:

establishing a connection with a radiocommunication terminal by a server;

receiving, by said server from said radiocommunication terminal via said connection, a first request for an initial portion of multimedia content, comprising at least one first multimedia scene;

in response to said first request for said initial portion of said multimedia content, transmitting by said server to said radiocommunication terminal over said connection said initial portion of said multimedia content, comprising said at least one first multimedia scene, where said at least one first multimedia scene is stored by said radiocommunication terminal, wherein said at least one first multimedia scene is capable of being displayed by said radiocommunication terminal;

receiving, by said server from said radiocommunication terminal via said connection, a second request for a second portion of said multimedia content, comprising at least one second multimedia scene;

in response to said second request for said second portion of said multimedia content, transmitting by said server to said radiocommunication terminal over said connection a first complementary portion of said multimedia content, in the form of a first complement of said at least one initial portion of multimedia content, said first complement including only differences between said at least one first multimedia scene and said at least one second multimedia scene separate from said at least one first multimedia scene, wherein said at least one second multimedia scene is capable of being displayed by said radiocommunication terminal according to said second request using said stored initial portion received via said connection and said stored first complementary portion received via said connection;

receiving, by said server from said radiocommunication terminal via said connection, a third request for a third portion of said multimedia content, comprising at least one third multimedia scene;

in response to said third request for said third portion of said multimedia content, transmitting from said server to said radiocommunication terminal over said connection at least one second complementary portion of said multimedia content, in the form of a second complement of said initial portion previously transmitted by said radiocommunication terminal, said second complement including only differences between said at least one first multimedia scene and said at least one third multimedia scene separate from said at least one first multimedia scene, where said second complementary portion is stored by said radiocommunication terminal, and wherein said at least one third multimedia scene is capable of being displayed by said radiocommunication terminal according to said third request using said stored initial portion received via said connection and said stored second complementary portion received via said connection;

wherein said connection is cut off by said radiocommunication terminal after each response received from said server, and is re-established to receive a next response from said server, such that a number of simultaneous requests to said server is limited.

\* \* \* \* \*